US012669783B2

(12) United States Patent
Romand et al.

(10) Patent No.: US 12,669,783 B2
(45) Date of Patent: Jun. 30, 2026

(54) DECORATIVE PART MADE BY INLAYING

(71) Applicant: Comadur SA, Le Locle (CH)

(72) Inventors: Johan Romand, Le Gratteris (FR); Damien Le Boudouil, Morteau (FR); Nicolas Aubry, La Chenalotte (FR); Pierry Vuille, Les Emibois (CH); Alexandre Netuschill, Le Cerneux-Pequignot (CH)

(73) Assignee: Comadur SA, Le Locle (CH)

( * ) Notice: Subject to any disclaimer, the term of this patent is extended or adjusted under 35 U.S.C. 154(b) by 903 days.

(21) Appl. No.: 17/056,262

(22) PCT Filed: Jun. 26, 2019

(86) PCT No.: PCT/EP2019/066956
§ 371 (c)(1),
(2) Date: Nov. 17, 2020

(87) PCT Pub. No.: WO2020/002402
PCT Pub. Date: Jan. 2, 2020

(65) Prior Publication Data

US 2021/0240138 A1 Aug. 5, 2021

(30) Foreign Application Priority Data

Jun. 28, 2018 (EP) .................................... 18180563

(51) Int. Cl.
*G04B 45/00* (2006.01)
*G04B 19/18* (2006.01)
(Continued)

(52) U.S. Cl.
CPC ......... *G04B 45/0076* (2013.01); *G04B 19/18* (2013.01); *G04B 37/226* (2013.01); *A44C 27/007* (2013.01); *C25D 11/04* (2013.01)

(58) Field of Classification Search
None
See application file for complete search history.

(56) References Cited

U.S. PATENT DOCUMENTS 3,156,086 A * 11/1964 Egger .................... G04B 37/08 368/286
4,106,956 A * 8/1978 Bercovici ............... C22F 1/057 148/439
(Continued)

FOREIGN PATENT DOCUMENTS

CH 699 993 A2 5/2010
CN 1067685 A 1/1993
(Continued)

OTHER PUBLICATIONS

Wikipedia, 7075 Aluminum Alloy, 2016.*
(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A method is for manufacturing a part including a support provided with at least one hollow filled with an aesthetic element forming a decoration on a face of the part intended to be visible. The method includes providing the support provided with the at least one hollow and providing a preform intended to form the aesthetic element of the part, and inlaying by pressing the preform into the at least one hollow of the support. The preform is made of a crystalline aluminium alloy. The inlaying is carried out at a temperature between the solidus temperature and the liquidus temperature of the crystalline aluminium alloy.

8 Claims, 5 Drawing Sheets

(51) Int. Cl.

| | |
|---|---|
| ***G04B 37/22*** | (2006.01) |
| *A44C 27/00* | (2006.01) |
| *C25D 11/04* | (2006.01) |

(56) References Cited

U.S. PATENT DOCUMENTS

| | | | | |
|---|---|---|---|---|
| 5,029,149 | A * | 7/1991 | Muller | G04B 37/22 368/280 |
| 9,272,327 | B2 * | 3/2016 | Okamoto | C22C 21/00 |
| 2009/0080294 | A1 | 3/2009 | Arita et al. | |
| 2013/0208577 | A1 * | 8/2013 | Netuschill | C25D 5/02 205/95 |
| 2016/0266551 | A1 * | 9/2016 | Oliveira | G04B 45/0076 |
| 2019/0191832 | A1 * | 6/2019 | Uldry | A44C 17/04 |

FOREIGN PATENT DOCUMENTS

| | | | | |
|---|---|---|---|---|
| CN | 102066131 | A | 5/2011 | |
| CN | 102752982 | A | 10/2012 | |
| EP | 0590904 | A1 * | 4/1994 | |
| EP | 2502877 | A1 * | 9/2012 | B81C 99/0095 |
| JP | 2008-89533 | A | 4/2008 | |
| JP | 2016-209581 | A | 12/2016 | |
| JP | 2018-13480 | A | 1/2018 | |
| KR | 10-2011-0022045 | | 3/2011 | |
| RU | 94 033 709 | A1 | 7/1996 | |

OTHER PUBLICATIONS

Aerospace Specification Metals, Inc., Aluminum 6061-T6, 2017.*

Espacenet, Translation of CH699993, 2023.*

Espacenet, Translation of EP2502877, 2023.*

Epspacenet, Translation of EP0590904, 2023.*

Office Action issued Jun. 28, 2022, in corresponding Korean Patent Application No. 10-2020-7034176 (with English Translation), 10 pages.

International Search Report issued on Aug. 5, 2019 in PCT/EP2019/066956 filed on Jun. 26, 2019, 2 pages.

European Search Report issued on Dec. 10, 2018 in U.S. Appl. No. 18/180,563, filed Jun. 28, 2018 (with English translation of Categories of Cited Documents), 4 pages.

Combined Chinese Office Action and Search Report issued Feb. 3, 2023 in Patent Application No. 201980038134.3 (with. English language translation and English translation of Category of Cited Documents), 14 pages.

* cited by examiner

DECORATIVE PART MADE BY INLAYING

CROSS-REFERENCE TO RELATED APPLICATIONS

The present application is a national stage entry of International Application No. PCT/EP2019/066956, filed Jun. 26, 2019, which claims priority to European Patent Application No. 18180563.1, filed on Jun. 28, 2018, the entire content and disclosure of each of which are incorporated by reference herein.

FIELD OF THE INVENTION

The present invention relates to a method for manufacturing a decorative part including a step of inlaying by hot-pressing a crystalline metal alloy into a support, particularly a ceramic support, and to the decorative part produced by the method.

PRIOR ART

It is known practice to decorate external watchmaking components with aesthetic elements. There are, for example, watch bezels decorated with patterns, such as indices. These bezels, which are generally made of ceramic, can be marked in various ways and with different materials, such as gold, silver or platinum. Said marking can be either embossed or deep marking. In the case of deep marking, this is achieved by filling preformed hollows in the support. The principle used for producing such marking consists in depositing a conductive primer by physical vapour deposition (PVD). Once the primer layer has been deposited, the hollows are filled with metal by electroforming. This method has the drawback of being complex and extremely slow.

Another method described in Patent document EP 2315673 consists in inlaying by pressing the aesthetic elements into hollows provided in the support. This document more particularly discloses an inlaying method of hot-pressing an aesthetic element made of an amorphous metal material into a ceramic support to form, for example, indices on a watch bezel. The use of an amorphous metal for the inlay makes it possible to work under low stresses and temperatures without risk of weakening the material of the support. However, the lack of contrast between the amorphous metal and the ceramic support does not allow for optimal visual appearance. Further, the method for producing a decorative part by inlaying an amorphous metal is relatively expensive since it requires a suitable treatment to maintain the amorphous structure of the metal.

SUMMARY OF THE INVENTION

To overcome the aforementioned disadvantages, it is an object of the present invention to propose a method for manufacturing a decorative part comprising an inlay step of pressing a crystalline metal alloy into one or more hollows arranged in a support which is notably made of ceramic. A crystalline metal inlay is intended to increase the contrast between the aesthetic element and its support and to reduce manufacturing costs. According to the invention, the choice of crystalline metal concerns an aluminium alloy which has the particular advantage of being deformable at low temperature compared to other crystalline metal alloys. The method of the invention thus makes it possible to make a decorative part comprising one or more aesthetic elements made of aluminium, which is difficult to achieve with other methods, whether by PVD deposition or electroforming.

Advantageously, the manufacturing method comprises, after the inlaying step and any mechanical grinding step, an electrochemical treatment intended to change the surface state of the inlaid aesthetic elements for protection purposes and/or for aesthetic purposes. This treatment may consist of selective anodization of said elements with or without colouring. Since the support, notably the ceramic support, is not an electrical conductor, one or more hollows open onto a face of the decorative part intended to be non-visible in use. These hollows communicating with the non-visible face form as many contact points making it possible to bring the current across the inlaid elements to be electrochemically treated. By virtue of these non-visible contact points, it is possible to supply current to numerous fine decorations, such as a tachymetric scale on a watch bezel. A wide range of colours and even colour shading can be obtained on these decorations. It is also conceivable to inlay a less inexpensive aluminium alloy and then harden it by anodization. This electrochemical treatment is carried out on the inlaid decorations in their final surface state—polished, satin finished, sand blasted—and therefore at the end of the manufacturing process.

Other features and advantages of the present invention will appear in the following description of preferred embodiments, presented by way of non-limiting example, with reference to the annexed drawings.

DETAILED DESCRIPTION

Figure 1:
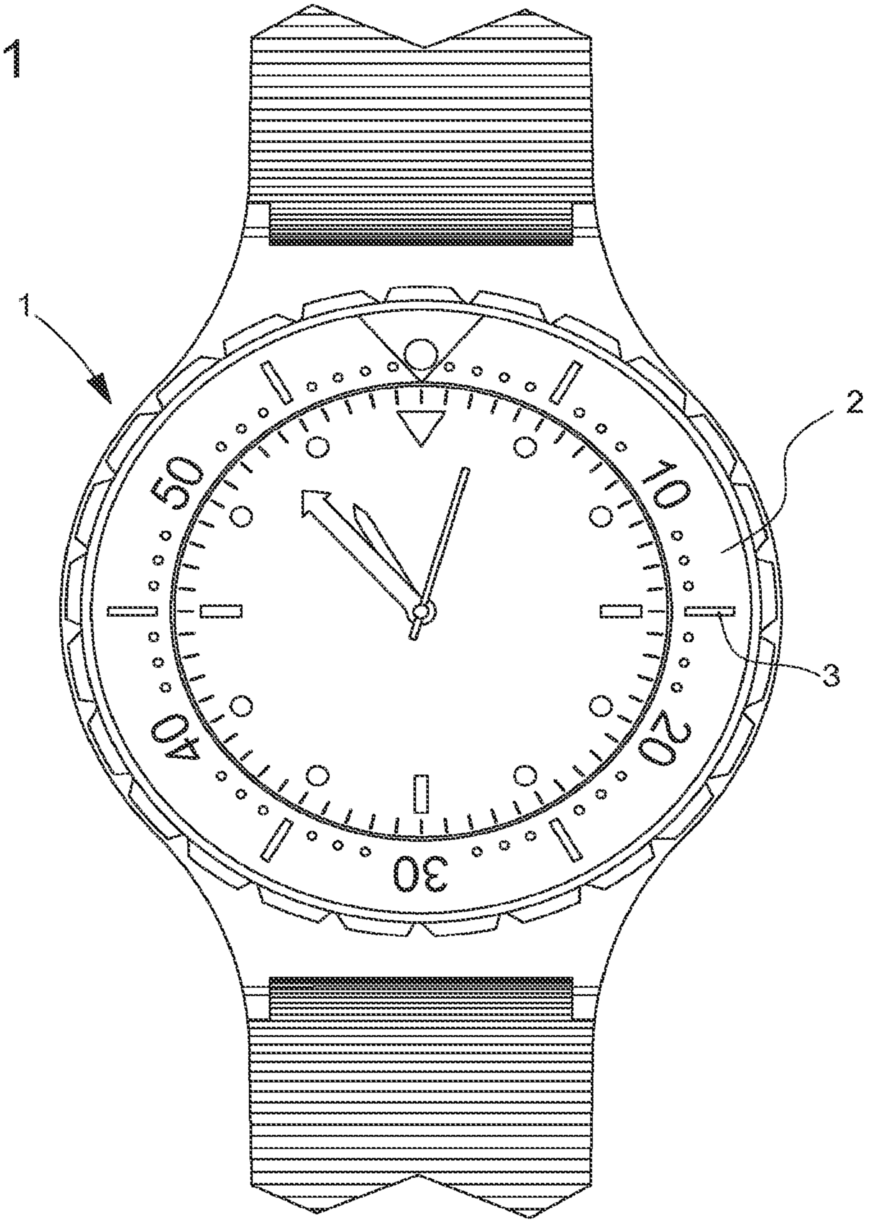
FIG. 1 represents a plan view of a decorative part, and in particular, a watch bezel comprising aluminium alloy indices produced by inlaying with the method according to the invention.
Figure 2:
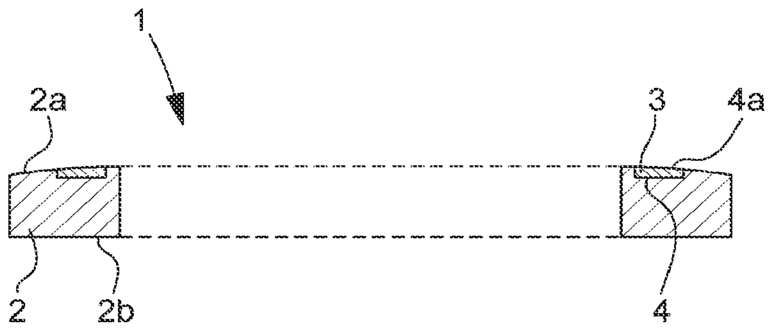
FIG. 2 represents a partial sectional view of this same decorative part.

The present invention relates to a method for manufacturing a decorative part by hot-pressing, also referred to as inlaying, one or more aesthetic elements in a support provided with one or more hollows and to the decorative part obtained from the method. The part can, in particular, be an external timepiece component, such as a bezel, a dial, a case, a crown, a pusher, a crystal, a bracelet element, etc. By way of example illustrated in FIGS. 1 and 2, part 1 is a watch bezel including an annular body forming the support 2 provided with hollows 4 arranged in said support 2 for receiving the aesthetic elements 3 forming the indices.

According to the invention, the aesthetic element is made of a crystalline metal alloy and more precisely of a crystalline aluminium alloy. The support is preferably made of a low-ductile material. It may, for example, be a ceramic, sapphire, enamel. etc. Preferably, it is a ceramic and more preferably, a zirconia. Thus, the part may be a zirconia watch bezel with indices made of an aluminium alloy. In particular, it may be the 7075 alloy which comprises zinc in an amount of ~6 wt. %. The aluminium alloy has the advantage of being malleable at low temperature as a result of its low melting temperature of around 650° C.

Figure 3:
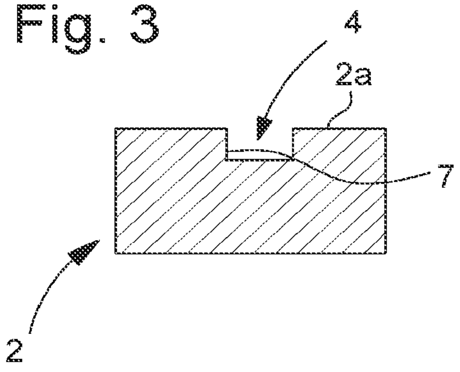
FIGS. 3 to 7 schematically represent the steps of inlaying the aluminium alloy preform in the support with the method according to the invention.
Figure 8:
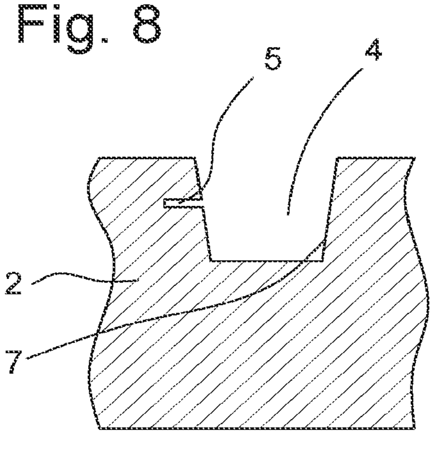
FIGS. 8 and 9 respectively represent two variants of the means implemented according to the invention for holding the aesthetic element within the hollow.
Figure 9:
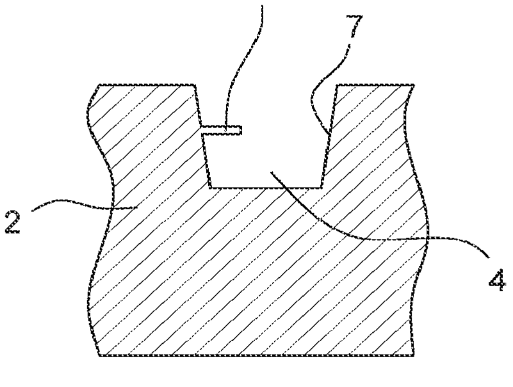
Figure 10:
FIG. 10 represents a variant of FIG. 2 with the hollows emerging on the rear face, i.e. the non-visible face of the bezel.

Support 2 comprises at least one hollow 4 made by laser etching, by machining etc. On the surface 2*a* of support 2 intended to be visible, hollow 4 has a shape 4*a* corresponding to the contour of the desired decoration. This hollow 4 may be blind (FIG. 2) or open onto a non-visible face 2*b* of support 2 (FIG. 10). Advantageously, the entire volume of hollow 4 is filled with aesthetic element 3 protruding from or flush with surface 2*a* of support 2. In a variant, it is also conceivable for the aesthetic element to fill the volume of the hollow only partially. Cavity 4 has sides 7 with a geometry suitable for optimal retention of the aesthetic element within the hollow. As shown schematically in FIG. 3, sides 7 may be substantially perpendicular to visible surface 2*a* of support 2 with the aesthetic element held by friction within the hollow. According to a preferred variant that is not represented, the sides are at least partially inclined with a narrowing towards the visible surface preventing the aesthetic element from moving out of the hollow. According to another preferred variant represented in FIG. 8, sides 7, whether inclined or not, are pierced with housings 5 which, once filled with the aesthetic element, form a stop which, in the same way as the inclined walls, prevent the aesthetic element from moving. According to another preferred variant shown in FIG. 9, protuberances 6 can be arranged in hollow 4 to perform a similar role to means for retaining the aesthetic element.

Figure 4:
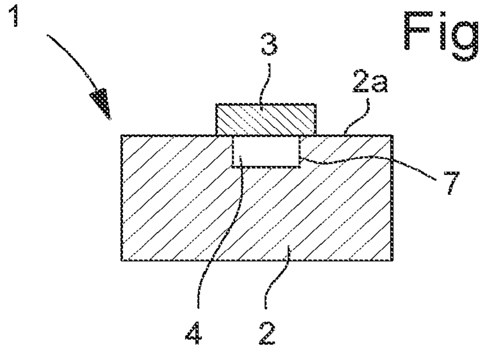
Figure 5:
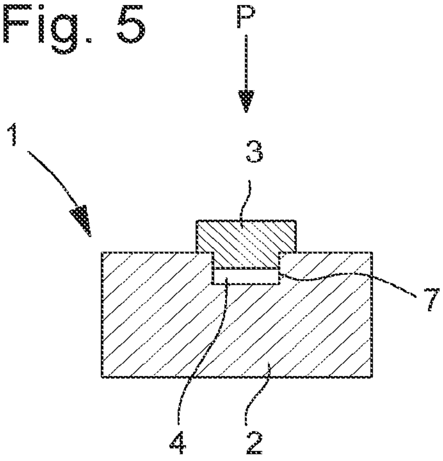
Figure 6:
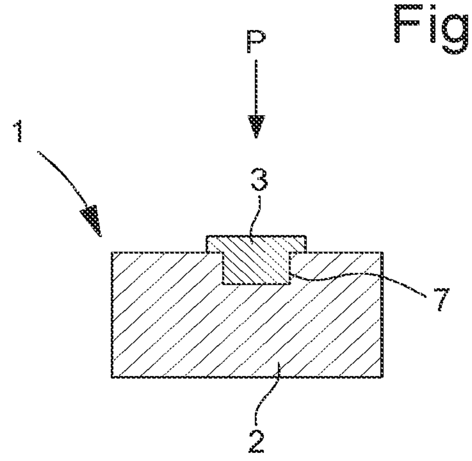
Figure 7:
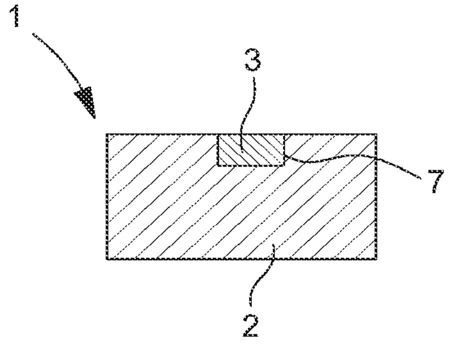

According to the invention, the aesthetic elements are inlaid by hot-pressing in the hollows of the support at a temperature between the solidus temperature and the liquidus temperature of the aluminium alloy forming the aesthetic element typically between 500° C. and 650° C. More precisely, the inlaying steps of the manufacturing method of the invention are schematically illustrated with reference to FIGS. 3 to 7. First of all, the support 2 provided with the one or more hollows 4 is provided. Likewise, the preform or preforms for forming the aesthetic element or elements 3 are provided. In the case of a watch bezel to be decorated with aluminium indices, the aesthetic element to be inlaid is in the form of an annular preform with a ring diameter and width of substantially equivalent dimensions to those of the indices. To prevent the preform from sticking to the press during the inlaying process, an anti-adherent layer, e.g. of boron nitride, can be applied to the press-contacting side. In a first step, the support is preheated to prevent thermal shock. Preferably, the preheating temperature is between 300 and 500° C. Next, preform 3 is placed on surface 2*a* of support 2 level with hollow 4 (FIG. 4). The assembly is placed in a press where the preform is heated to a temperature comprised between the solidus and liquidus temperature of the preform material, thereby softening the material prior to the pressing process. Next, a pressure P is applied to preform 3 in order to fill hollows 4 with the aluminium alloy (FIG. 5 and FIG. 6). Preferably, the load during the inlaying process is kept at a value less than 1000 kg to avoid damaging the support. This load is preferably comprised between 500 and 800 kg. This pressing cycle can be carried out in several steps with a preload step before increasing the pressure up to the maximum desired pressure. The step of inlaying the aluminium alloy in the hollows is then followed by a cooling step and possibly a mechanical grinding step such as polishing to remove the surplus of aesthetic element 3 (FIG. 7) and to create visible surfaces of the support and of the aesthetic element connected to each other without any discontinuity.

By way of example, in the case of an aluminium 7075 alloy inlay in a zirconia support, the support was preheated to 450° C., the preform was heated to 550° C. for 90 seconds and pressed under a load of around 750 kg.

Advantageously, after the mechanical grinding step, the aesthetic element is subjected to a finishing treatment. This treatment may be a selective electrochemical treatment of the inlaid metal material, and more precisely, an anodizing process with or without colouring to alter the appearance and/or the hardness of the inlaid material. As the present invention is intended mainly for electrically non-conductive supports, the difficulty lies in the supply of current to the aesthetic elements during the electrochemical treatment and via contact points which absolutely must not be visible on the decorative part. To this end, one or more of the hollows are configured to open onto a face of the decorative part that will not be visible. These hollows opening onto the non-visible face form as many contact points making it possible to supply current across the inlaid aesthetic elements. Returning to the example of the ceramic watch bezel comprising indices made by inlaying a crystalline aluminium alloy, the hollow 4 for each of the indices opens onto the rear face 2*b* of bezel 1, as illustrated in FIG. 10. Contact points 4*b* make it possible to supply current across each of the indices during the electrochemical treatment. These contact points 4*b* on rear face 2*b* of support 2 may have a smaller cross-section than that of portion 4*a* of the hollow opening onto visible face 2*a* of support 2. These contact points make it possible to perform the same electrochemical treatment for each index or optionally to combine different treatments and therefore colours by only supplying the current across one or more of the indices for each electrochemical treatment.

Figure 11A:
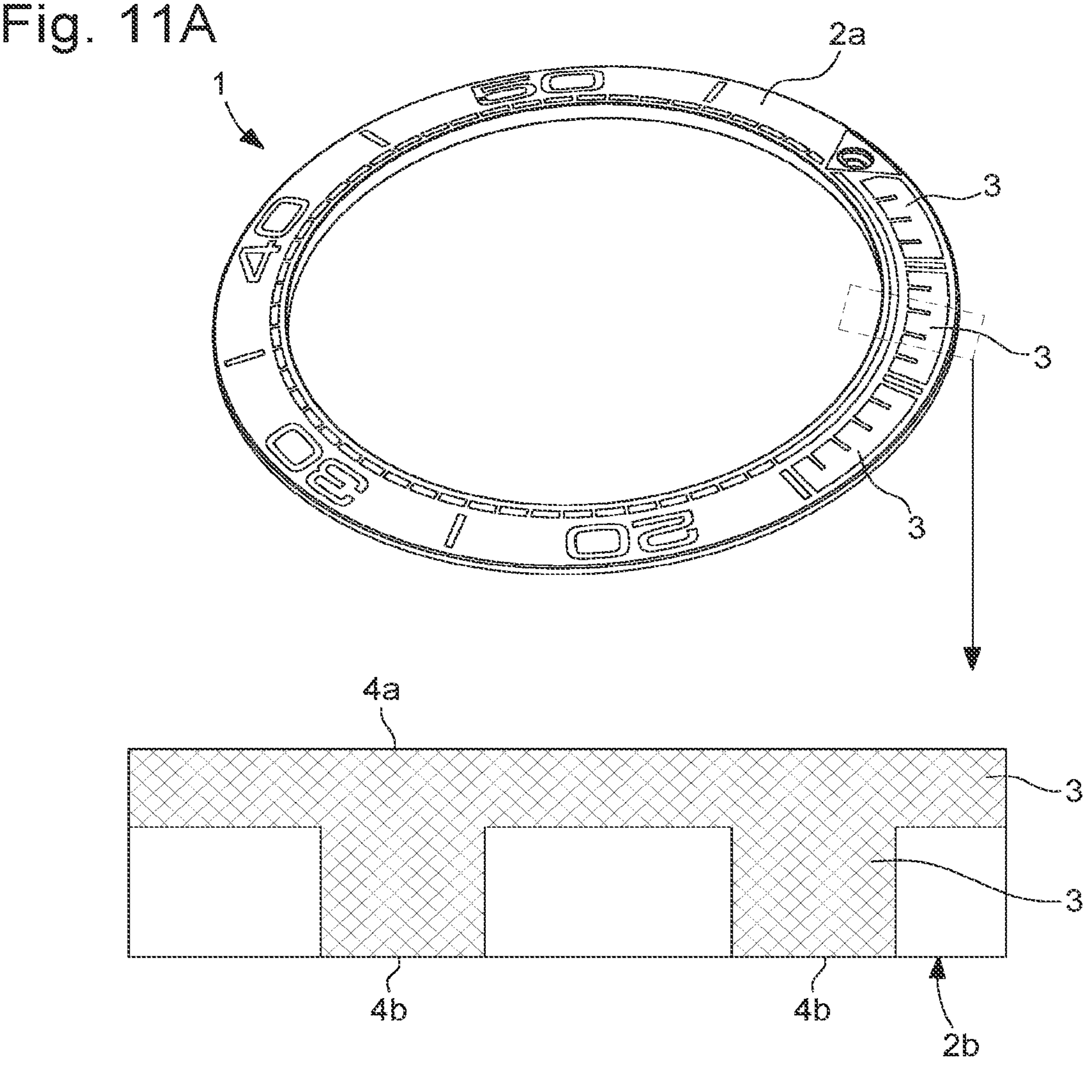
FIG. 11A represents a view of the front face, i.e. the visible face, of the bezel inlaid with several aesthetic elements, together with a partial sectional view of the bezel, focused on one aesthetic element.
Figure 11B:
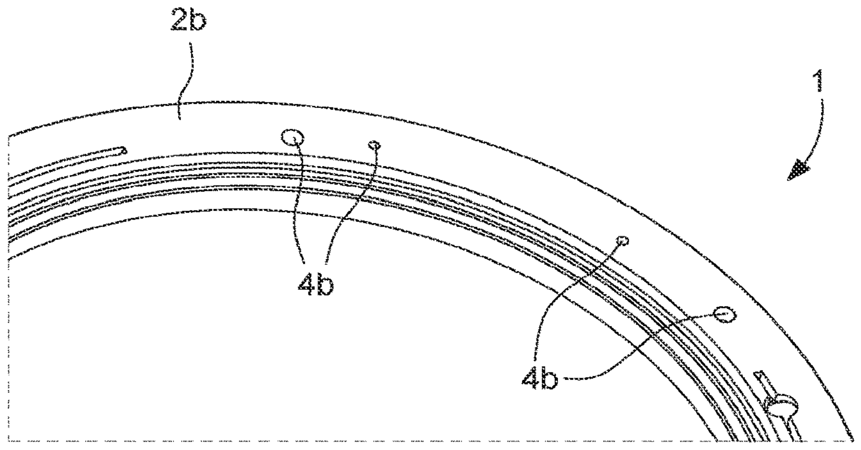
FIG. 11B represents a view of the rear face of this same bezel.
Figure 12A:
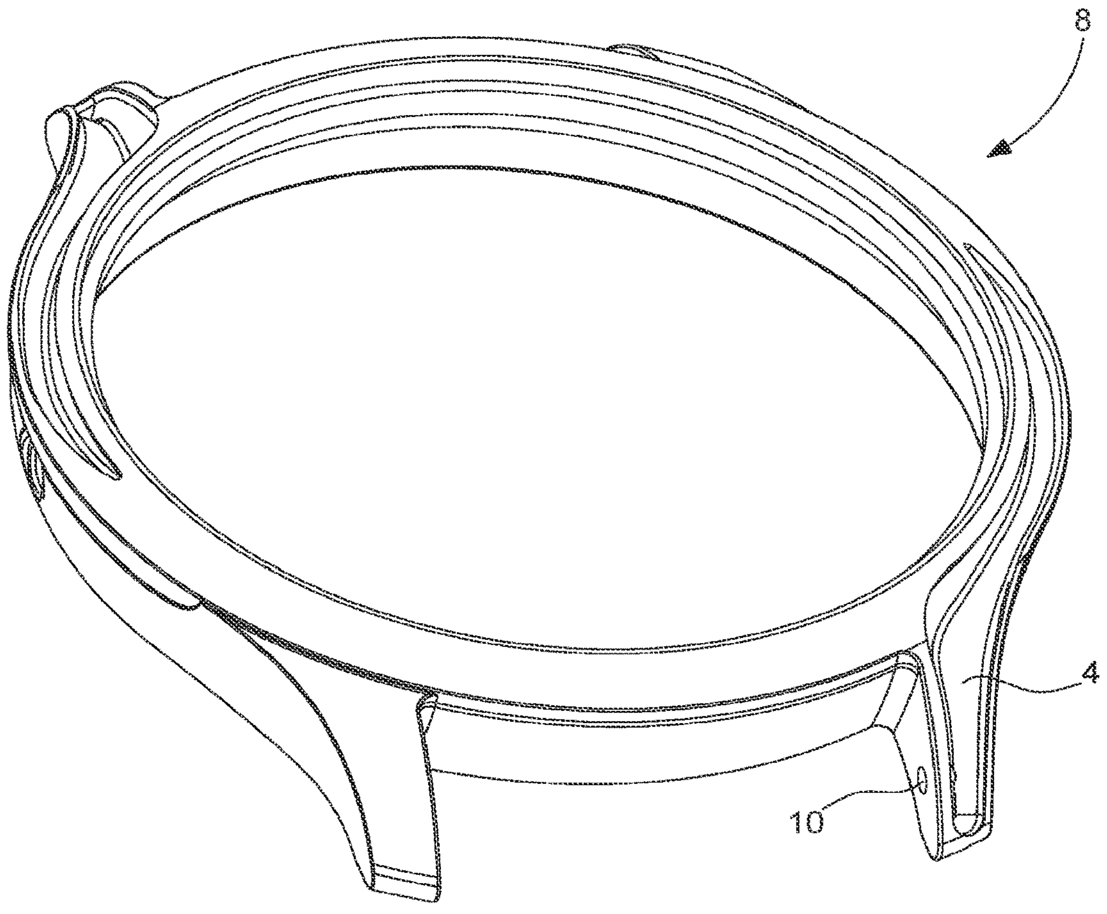
FIG. 12A represents a three-dimensional view of a watch case comprising in the case middle a hollow communicating with the bar hole.
Figure 12B:
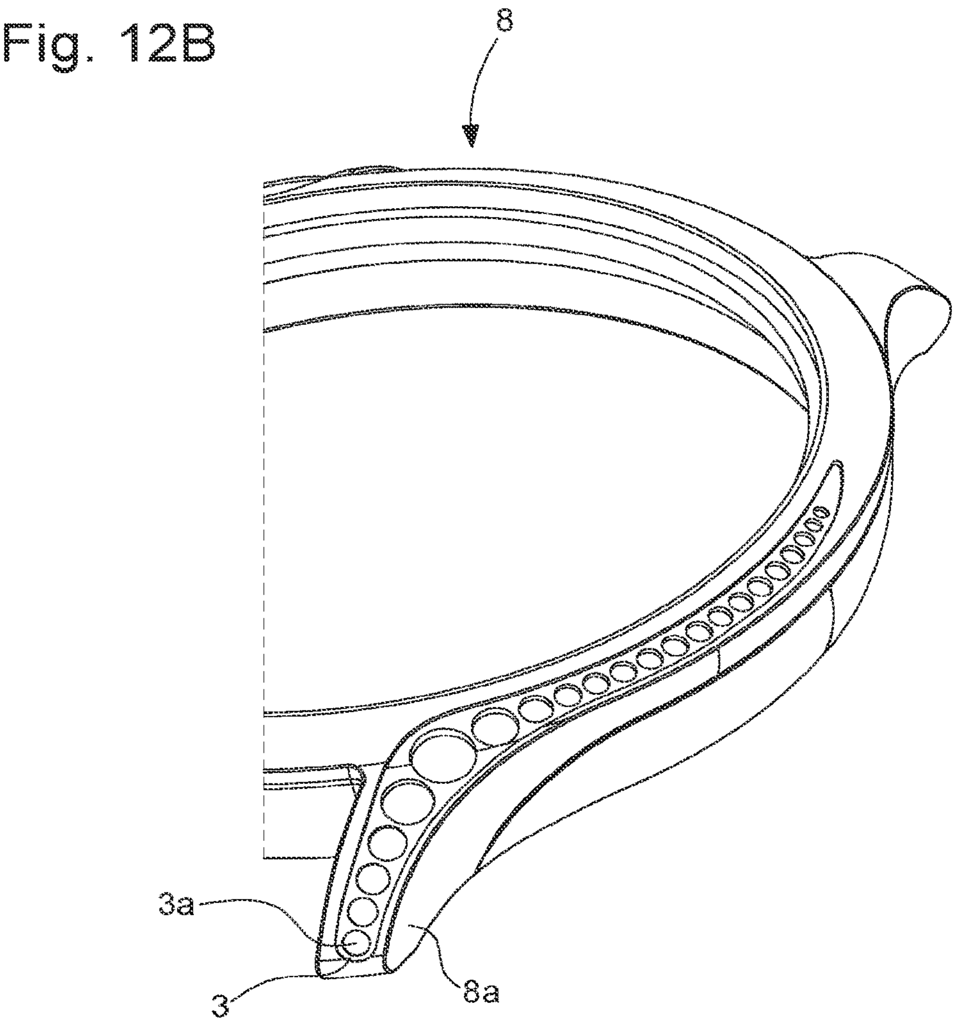
FIG. 12B represents this same watch case comprising an aesthetic element inlaid in the hollow.
Figure 12C:
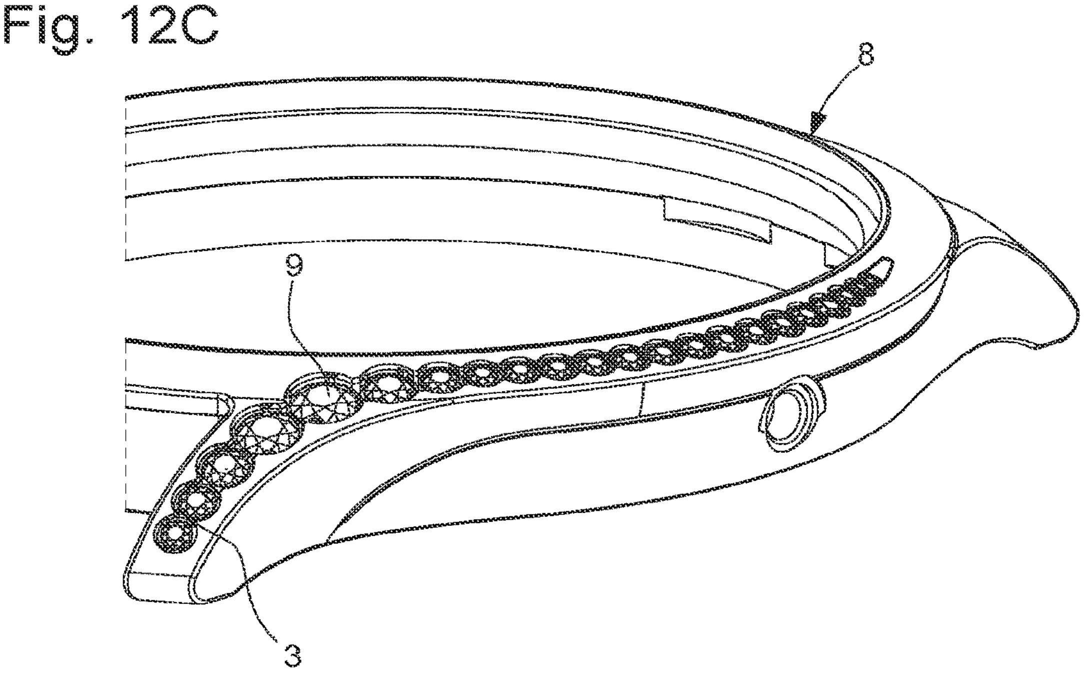
FIG. 12C represents this same watch case comprising the aesthetic element inlaid in the hollow and set with stones.

If aesthetic element 3 is larger in size, as in the examples of FIGS. 11A and 12B, several contact points may be required per aesthetic element in order to ensure a uniform electrochemical treatment of the aesthetic element. In FIG. 11A, for example, three aesthetic elements 3 are distributed over an annular portion of visible face 2*a* of bezel 1. In this configuration, aesthetic elements 3 are inlaid on substrate 2 including the indices made of non-conductive material. On its rear face 2*b* visible in FIG. 11B, bezel 1 is provided with several orifices 4*b* communicating with hollows 4 to form the contact points for supplying current across these three elements. As shown in the sectional view of FIG. 11A, two contact points 4*b* are provided per aesthetic element 3. FIGS. 12B and 12C represent another configuration of an aluminium aesthetic element inlaid in a hollow arranged in a support. Aesthetic element 3 extends as far as a horn 8*a* of the middle part of watch case 8 and comprises housings 3*a* for setting stones 9. In a similar manner to the other examples, the hollow receiving the aesthetic element opens at least at one location onto a non-visible face of the watch case. It is thus conceivable for hollow 4 to communicate with the bar hole 10, as illustrated in FIG. 12A. Of course, hollow 4 can communicate in several places via other through holes making it possible to create contact points supplying current to aesthetic element 3. The present invention thus makes it possible, by means of the electrical contact point(s) provided on a non-visible face of the watch case, to electrochemically treat the aesthetic element once the stones have been set.

The present invention has been more specifically illustrated for a decorative part for watchmaking, but it is evident that the method of the invention applies to the production of decorative parts in many other fields, such as jewellery, telephony, the automobile industry, etc.

KEY TO DRAWINGS (1) Decorative part
(2) Support
  a. Visible face
  b. Non-visible face
(3) Aesthetic element or preform
  a. Housing
(4) Hollow
  a. Portion opening onto the visible face of the support
  b. Portion opening onto the non-visible face of the support
(5) Housing inside the hollow
(6) Protuberance in the hollow
(7) Side of the hollow
(8) Watch case
  a. Horn
(9) Stone
(10) Bar hole

The invention claimed is:

1. A method for manufacturing a part comprising a support provided with at least one hollow filled with an aesthetic element forming a decoration on a face of the part configured to be visible, said method comprising:

providing the support provided with said at least one hollow and providing a preform configured to form the aesthetic element of the part, said at least one hollow opens out in at least one place on a face of the part configured to be non-visible;

inlaying by pressing the preform into said at least one hollow of the support;

mechanical grinding following the inlaying; and electrochemical surface treating the aesthetic element following the mechanical grinding, wherein the preform is made of a crystalline aluminium alloy, and wherein the inlaying is carried out at a temperature between the solidus temperature and the liquidus temperature of the crystalline aluminium alloy, and wherein, after the mechanical grinding, said at least one hollow includes several orifices that open out at several places on the face of the part configured to be non-visible, to respectively form more than one contact point for the aesthetic element to supply current across the aesthetic element during the surface treatment, wherein, after the mechanical grinding, said decoration extends continuously in contact with the face between the several orifices.

2. The method according to claim 1, wherein the support is made of a material chosen from among ceramic, sapphire and enamel.

3. The method according to claim 1, wherein the support is made of a zirconia-based ceramic.

4. The method according to claim 1, wherein the crystalline aluminium alloy is a 7075 alloy.

5. The method according to claim 1, wherein the support is preheated prior to the inlaying to a temperature comprised between 300 and 500° C.

6. The method according to claim 1, wherein the inlaying by hot pressing is carried out under a load of between 500 and 1000 kg.

7. The method according to claim 1, wherein the inlaying by hot pressing is carried out at a temperature comprised between 500 and 650° C.

8. The method according to claim 1, wherein each of the several orifices has a different sized opening on the face of the part configured to be non-visible.

* * * * *